United States Patent Office 2,842,411
Patented July 8, 1958

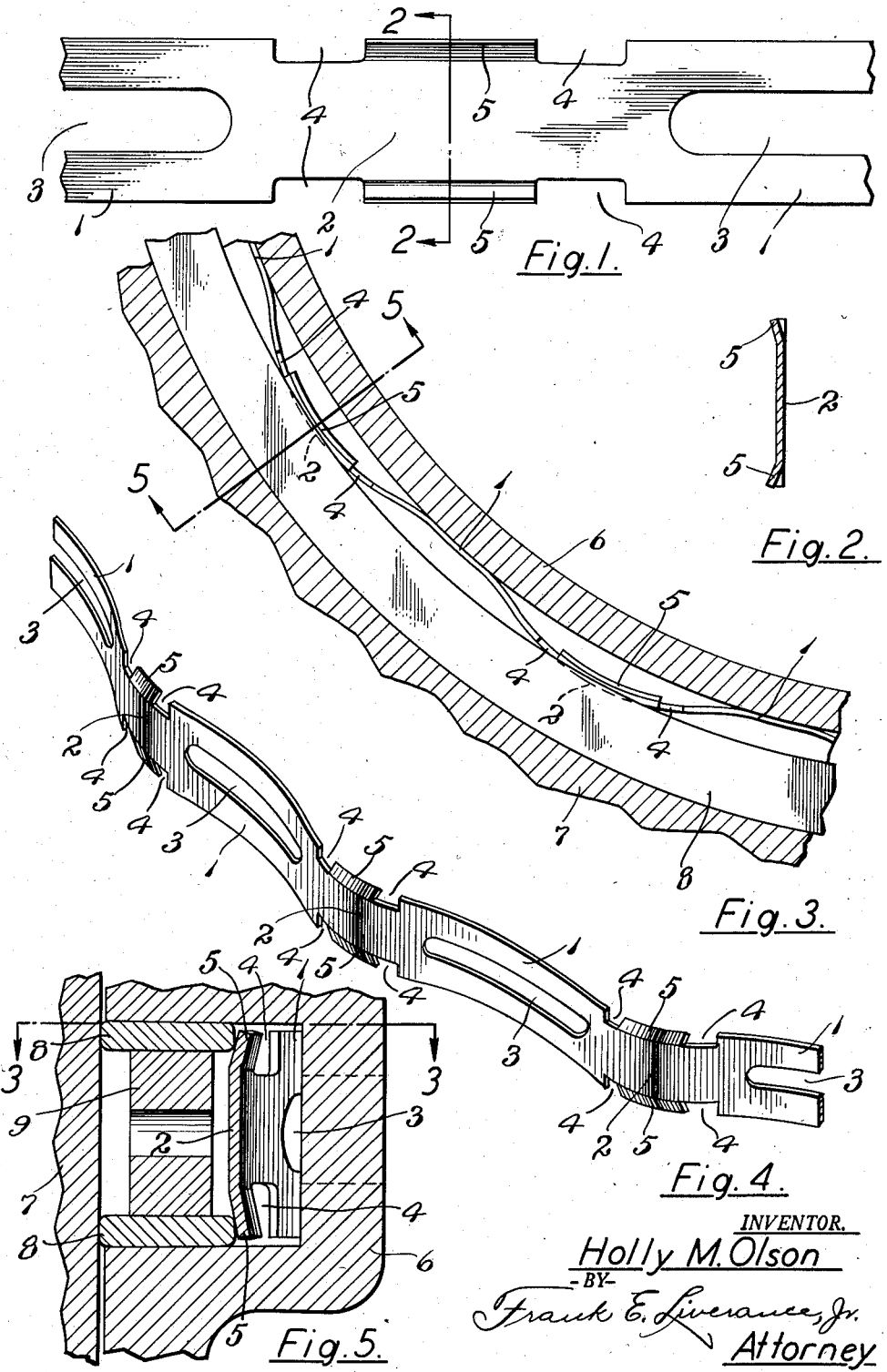

2,842,411

TRIPLE PURPOSE PISTON RING EXPANDER

Holly M. Olson, Muskegon, Mich., assignor to Sealed Power Corporation, Muskegon, Mich., a corporation of Michigan Application December 27, 1954, Serial No. 477,625

4 Claims. (Cl. 309—41)

The present invention relates to a novel expander of the corrugated, thin spring metal type which is interposed between the bottom of a piston ring groove and a piston ring outwardly of the expander. Such expander has alternate inwardly and outwardly extending humps, the outwardly extending humps pressing against the piston ring and the inwardly extending humps against the bottom of a piston ring groove. Such expander, when a piston equipped therewith and with an associated piston ring is installed in an engine cylinder, is flattened or strained from shape, setting up outward radial forces which hold the piston ring, at its cylinder contacting surface, in close engagement with the cylinder.

The piston rings with which such expander may be used are of many different constructions. With the present invention the expander is designed to be used primarily in the lower or so-called oil grooves of a piston, excess lubricating oil which is splashed upwardly into the lower ends of the cylinders first coming to such lower piston rings which scrape excess oil from the cylinder walls. The excess oil is conducted through venting or oil passing openings in the piston ring to the bottom of the ring groove and therefrom through the piston walls to the interior of the piston and thence to the engine crankcase.

Further, my invention is to be used with a well known type of lubricant salvaging piston ring which has long been used and which includes in its construction upper and lower thin parted metallic rails held spaced apart by a spacer between them which has vent passages therethrough for the passage of excess lubricating oil. The expanders used with such rings press against the inner edges of such upper and lower thin rails thereof forcing the rails outwardly so that their outer curved edges are pressed with a desired unit pressure against the cylinder walls.

A general object of this invention is to provide a novel, simple, easily manufactured expander of the type noted which, by its action against the spaced rails of the piston ring with which it is associated, forces the rails outward radially as mentioned, also acts to press the rails against the upper and lower sides of the ring groove, that is, exerts a pressure on the rails axially, and has the further function of supporting the rails at their inner edges in spaced relation.

The expander which I have invented while made generally along conventional lines in the matter of structure and material, with a provision of vent holes for the free passage of lubricating oil and having the mentioned humps properly spaced to provide a desired ring tension, has additional lubricant venting passages therethrough which increases the degree of free passage of lubricant to the bottom of the piston ring groove, notches being made at opposite sides of the outwardly extending humps and at the upper and lower edges of the expander so that the edge portions of such outwardly extending humps between such openings may be inclined inwardly to the vertical when in use in a vertically positioned piston in an engine, thus accomplishing a support for the inner edges of the rails, the outward radial pressure wanted, and also the axial pressure holding the rails against opposite sides of the piston ring groove, thereby effectively closing off and sealing against leaks between the rails and the sides of the piston ring groove.

An understanding of the invention may be had from the following description taken in connection with the accompanying drawing, in which, Fig. 1 shows in inner elevation a fragmentary portion of the length of an expander in accordance with my invention.

Fig. 2 is a transverse vertical section on the plane of line 2—2 of Fig. 1.

Fig. 3 is a horizontal section substantially on the plane of line 3—3 of Fig. 5, the piston ring and expander in a piston ring groove of a piston being in plan.

Fig. 4 illustrates in perspective a fragmentary portion of the length of an expander made in accordance with my invention, and Fig. 5 is a transverse vertical section, substantially on the plane of line 5—5 of Fig. 3, showing fragmentarily one side of a piston at the oil piston ring groove therein installed in a cylinder, and with the piston ring and expander of my invention in such oil groove of the piston.

Like reference characters refer to like parts in the different figures of the drawing.

The conventional thin spring metal expander in which my invention is incorporated includes a preselected length of thin spring metal, preferably steel ribbon stock, which is made into a generally circular form so that the expander is parted where the ends of the member approach each other, such parting being for passage of the expander over the upper end of a piston upon installation in a piston ring groove. Such conventional expander has alternate inwardly and outwardly extending curved humps 1 and 2 best shown in Fig. 4. The inwardly curved portions or humps 1 are longer than the outwardly extending humps 2, the inwardly extending sections 1 connecting successive outward humps 2; and vent openings or passages in the form of elongated slots 3 between upper and lower edges of the sections 1 are shown for the passage of lubrication oil. Many other types of oil passing openings of passages may be used.

With my invention each of the outwardly extending shorter humps 2 at both the upper and lower edges thereof and at generally equal distances from the vertical center line of each hump are cut to provide notches or shallow recesses 4. Between each of the pairs of recesses 4 at the upper and lower edges of each outwardly extending hump 2 a short length of metal 5 is left which, with my invention, is shaped and formed so as to incline at an acute angle to the vertical, the upper sections 5 inclining upwardly and to the rear and the lower sections 5 downwardly and to the rear. This is shown best in Fig. 4, though also clearly shown in Fig. 5. The angle of inclination to the vertical may be between 5° and 20°.

When the expander is used in conjunction with the spaced rail type of oil ring in a piston 6 installed in a cylinder 7, upper and lower, thin metal, parted rails 8 are located one against the upper side and the other against the lower side of the lowermost oil groove of the piston 6, being held apart by a spacer 9 between the rails. The spacer shown in Fig. 5 between the rails is shown for diagrammatic and conventional purposes, there being a large number of differently constructed spacers used between such rails, all of which have passage for oil which is scraped from the walls of the cylinder 7 by the outer edges of such rails and which, collected in front of the spacer 9, passes therethrough to the bottom of the piston ring groove.

The novel expander of my invention is installed in the piston ring groove with its inwardly bowed connecting sections or humps 1 against the bottom of the ring groove and the inclined sections 5 against the inner edges of the rails 8 as shown in Fig. 5. When such a piston ring and expander within the ring groove of a piston are installed in a cylinder 7 the closing of the rails at their partings forces the rails inwardly to press against the expander and flatten it as indicated in Fig. 2, placing the expander under strain deformation with a generation of radial forces which tend to press the rails outwardly and bring their outer edges with a desired unit pressure against the cylinder wall 7.

The rails 8 at their inner edges press snugly against the outer sides of the sections or segments 5. In addition to being forced radially outward, they have forces acting thereupon at the inner edges of the rails which tend to press such rails against the upper and lower side of the ring groove, thereby closing off and stopping any leaks between the outer sides of said rails and the upper and lower sides of the ring groove. Also the inner edges of the rail are held separated from each other and are prevented from movements toward each other at their inner edge portions. There is a line contact between the outer sides of the sections 5 and the inner edges of the rails 8. In addition to the large ventilation for lubricating oil passage made by the elongated slots 3, it is evident there are other lubricating passages provided by the recesses at 4 made at each side of each outwardly extending hump 2.

The novel expander of my invention is readily and economically produced. It is installed in the same manner as all expanders of this type have been previously installed. But with it there is accomplished not only the desired exertion of radial pressures against the rails to seal against the cylinder bore, but an exertion of axial pressure to hold the rails against the upper and lower ring groove sides with the described sealing function coming therefrom and, in addition, a supporting and maintenance of the rails spaced at their inner edges.

The invention is defined in the appended claims and is to be considered comprehensive of all forms of structure coming within their scope.

I claim:

1. In a piston ring having upper and lower, thin, parted, circular, metallic rails, and a circular, parted spacer between said rails, a circular, parted, thin ribbon, spring steel, corrugated expander of generally uniform width back of said rails having alternate, inwardly and outwardly extending humps having intermediate portions at upper and lower edges separated a short distance from adjacent edge portions of said expander, the opposed edge portions of said outwardly extending humps bearing against the inner edges of said rails, said hump edge portions having each an inward incline at an acute angle to the width of said expander, and said expander at the inwardly extending humps having elongated slots lengthwise thereof located generally midway between the upper and lower edges of said inwardly extending humps.

2. In a piston ring of the type having upper and lower thin, parted, circular rails and a parted, circular spacer between the rails, an improved expander comprising a circular, parted, thin ribbon corrugated spring metal ring having alternate radially inwardly and radially outwardly extending humps, said expander ring being of generally uniform width, said inwardly extending humps having vent openings therethrough extending circumferentially of the ring and located generally midway between the upper and lower edges of said inwardly extending humps, the outwardly extending humps having opposite edge portions thereof inclined radially inwardly at an acute angle to the vertical axis of the ring, said expander ring being located within the rails with said inwardly inclined edge portions bearing against the radially inner edges of the upper and lower rails, said inwardly inclined edge portions of the outwardly extending humps being spaced slightly circumferentially from the adjacent edge portions of the inwardly extending humps.

3. The combination called for in claim 2 wherein the spaces between the inwardly inclined portions of the outwardly extending humps and the adjacent edge portions of the inwardly extending humps are defined by shallow recesses along the upper and lower edges of the ring which have a circumferential extent substantially less than said humps.

4. A piston ring expander for use with a pair of upper and lower rails in a piston ring groove comprising a thin, parted, generally circular corrugated spring metal ring having alternate radially inwardly and radially outwardly extending humps, the opposite edge portions of each outwardly extending hump having a pair of circumferentially spaced shallow recesses therein which separate the opposite edge portions of each outwardly extending hump from the opposite edge portions of the adjacent inwardly extending humps, said recesses having a circumferential extent substantially less than the circumferential extent of the opposite edge portions of the inwardly extending humps, the edge portions of the outwardly extending humps between successive recesses being inclined in a radially inward direction at an acute angle to the vertical axis of the ring and being relatively short in circumferential extent as compared with the circumferential extent of the opposite edge portions of said inwardly extending humps, the opposite edge portions of the outwardly extending humps being generally coplanar with the opposite edge portions of the inwardly extending humps and the inwardly extending humps having vent openings therethrough extending circumferentially of the ring generally midway between the opposite edges thereof.

References Cited in the file of this patent

UNITED STATES PATENTS

| | | |
|---|---|---|
| Re. 20,588 | Teetor | Dec. 14, 1937 |
| 345,767 | Buckley | July 20, 1886 |
| 1,703,905 | Solenberger | Mar. 5, 1929 |
| 1,720,583 | Walsh | July 9, 1929 |
| 1,811,012 | Hodge | June 23, 1931 |
| 2,170,276 | Phillips | Aug. 22, 1939 |
| 2,695,825 | Estey | Nov. 30, 1954 |